Patented Dec. 30, 1941

2,267,971

UNITED STATES PATENT OFFICE 2,267,971

PROCESS OF PRODUCING GLUTAMIC ACID

Géza Braun, New York, N. Y., assignor to Standard Brands Incorporated, New York, N. Y., a corporation of Delaware No Drawing. Application October 15, 1936, Serial No. 105,830. Renewed January 17, 1940

12 Claims. (Cl. 260—534)

This invention relates to the manufacture of pure glutamic acid and its salts from crude glutamic acid hydrochloride without the isolation of pure glutamic acid hydrochloride.

Heretofore, glutamic acid and its salts have been prepared from pure glutamic acid hydrochloride, which in turn was obtained by recrystallization from the crude glutamic acid hydrochloride. This latter operation was carried out in a manner that the crude hydrochloride was dissolved in a small amount of hot water, the solution purified with active carbon, cooled and saturated with hydrogen chloride gas, when the glutamic acid hydrochloride crystallized out in pure state. On account of the operation with the gaseous hydrochloric acid and the losses connected with the recrystallization, the purification of the crude hydrochloride is an expensive operation.

I have found, however, that this purification of the crude glutamic acid hydrochloride—as far as the preparation of glutamic acid and its salts is concerned—is not necessary at all, thereby the process of making the free glutamic acid is materially simplified and its cost materially lessened.

It is the object of this invention to obviate disadvantages of the previous processes and provide a process by which pure glutamic acid and its derivatives may be obtained directly from the crude glutamic acid hydrochloride.

An additional object is to utilize reagents, not previously used for the purpose, by which the glutamic acid may be precipitated from the solution of its hydrochloride (either pure or crude), and which have special advantages in such use.

The crude glutamic acid hydrochloride, if it has been properly prepared, contains only ammonium chloride as an impurity in appreciable amounts. Therefore, when glutamic acid is to be prepared from this crude product the problem is to selectively precipitate the glutamic acid with a suitable reagent in the presence of ammonium chloride. To accomplish this purpose, it is necessary at first to determine quantitatively the amount of ammonium chloride and of glutamic acid hydrochloride present, and then the precise amount of reagent necessary for the neutralization of hydrochloric acid chemically combined with the glutamic acid is calculated and added and the free glutamic acid is thereby precipitated in a substantially pure form. The glutamic acid is but slightly soluble in cold water, whereas all of the impurities or associated substances involved in my process are very soluble in it; therefore the glutamic acid may be obtained in high state of purity directly from its crude hydrochloride.

The following example will illustrate my process, although the details may be considerably altered:

One part of crude dry glutamic acid hydrochloride, obtained from proteins of wheat by hydrolysis with hydrochloric acid or in any other manner, is dissolved in 3 parts of water, the solution is treated with a small amount of active carbon and filtered. The pale yellow filtrate is now made up to known volume and in an aliquot part of the solution the total amount of chlorine present in the form of chlorides and hydrochlorides is ascertained by titration with 0.1 N silver nitrate solution and the amount of ammonia present in chemical combination is ascertained in the usual manner. If the amount of 0.1 N silver nitrate solution required for reacting with chlorides and hydrochlorides is found to be $T$ cc., and the amount of 0.1 N sulfuric acid required for reacting with ammonia $t$ cc., then the amount of hydrochloric acid chemically combined with the glutamic acid will be $T$ minus $t$ cc. of 0.1 NHCl. Thus knowing the precise amount of such combined hydrochloric acid to be neutralized, the amount of neutralizing agent is calculated and added to the solution of crude glutamic acid hydrochloride in solid form or in a concentrated aqueous solution. The glutamic acid begins to precipitate immediately and the precipitation is soon complete at 0° C. After 2 to 3 hours standing at 0° C. or a lower temperature, the glutamic acid is removed from associated liquid by filtration, washed chloride-free with ice water and dried at a relatively low temperature or under reduced pressure. The mother liquor may be concentrated to one third of its original volume, cooled and a second crop of glutamic acid may be obtained as above. The glutamic acid is obtained in pure state and with the same yield as from pure glutamic acid hydrochloride.

For the neutralization of hydrochloric acid chemically combined with the glutamic acid, various reagents, such as hydroxides and carbonates of alkalies or alkaline earth metals, etc., have been applied and suggested. I have found, however, that besides these compounds a great variety of compounds may be advantageously used. The class or group of acid-neutralizing substances which may be employed for the stated purpose in the practice of my invention (and some of which, for reasons of economy or other practical considerations will of course be preferred to others, even of generally similar reactivity) is inclusive of the following sub-classes or groups:

1. Ammonia, aliphatic and aromatic amines and nitrogen bases, such as diethylamine, aniline, pyridine, quinoline, etc.
2. Salts of weak acids, such as formates, acetates, butyrates, lactates, etc., particularly ammonium formate and acetate, calcium or barium acetate, or calcium lactate.

Naturally I prefer to use those reagents that are the most economical such as ammonium hydroxide, ammonium carbonate, ammonium formate and calcium acetate.

The salts of glutamic acid are easily prepared from the pure glutamic acid. Two of its salts are at present industrially important, the sodium acid salt and the ammonium acid salt. These are prepared as follows:

The glutamic acid is suspended in a small amount of water, then the calculated amount of sodium or ammonium hydroxide (or carbonate) necessary for the neutralization of one carboxyl group of the glutamic acid is added and the solution is stirred until it becomes clear. Then it is decolorized with active carbon, if necessary, and the colorless solution is evaporated to a thick syrup, preferably under reduced pressure.

The syrupy solution is then cooled under stirring and is seeded with a few crystals of sodium glutamate or ammonium glutamate. The mass solidifies immediately. It is then pulverized and dried at low temperature or under reduced pressure. The yield of pure sodium acid or ammonium acid glutamate is quantitative. Other desired salts may be similarly prepared.

Salts of the usually so-called "weak acids," such as those of acetic acid, have been found to be especially advantageous for the obtainment of glutamic acid from solutions of its salts, such as solutions of either crude or pure glutamic acid hydrochloride. For example, by the treatment of a solution of glutamic acid hydrochloride with a suitable acetate in properly reactive proportion, glutamic acid acetate is formed which, being unstable, immediately hydrolizes and forms glutamic acid, which thereupon crystallizes and precipitates from the acid solution, and by this method a glutamic acid of substantial and satisfactory purity is more readily obtained than by the use of other reagents, such as alkaline earth hydroxides or carbonates which have heretofore been used in the treatment of glutamic acid hydrochloride for the production of glutamic acid.

In the claims, the expression "alkali-forming cation" is intended to be interpreted in its broad significance and is especially intended to include ammonium, alkali metal and alkaline earth metal ions, it being of course understood that a salt containing such ions which may be used for effecting the precipitation of the glutamic acid in the process claimed will contain a proportion of its different constituent ions in accord with the respective valencies and individual or aggregate atomic weights of such ions.

Having described my invention, what I claim as new, and desire to secure by Letters Patent is:

1. A process of producing glutamic acid from glutamic acid hydrochloride, which comprises treating a solution of glutamic acid hydrochloride with a soluble salt of acetic acid.

2. A process of producing glutamic acid from glutamic acid hydrochloride, which comprises treating a solution of glutamic acid hydrochloride, also containing ammonium chloride, with a soluble salt of acetic acid, in such proportion as to effect reaction with the glutamic acid hydrochloride and liberation and selective separation of glutamic acid.

3. A process of producing glutamic acid from glutamic acid hydrochloride, which comprises treating a solution of glutamic acid hydrochloride with a soluble salt of formic acid.

4. A process of producing glutamic acid from glutamic acid hydrochloride, which comprises treating a solution of glutamic acid hydrochloride, also containing ammonium chloride, with a soluble salt of formic acid, in such proportion as to effect reaction with the glutamic acid hydrochloride and liberation and selective separation of glutamic acid.

5. A process of producing glutamic acid from glutamic acid hydrochloride, which comprises treating a solution of glutamic acid hydrochloride with a soluble salt comprising an alkali-forming cation and an anion of an unsubstituted lower aliphatic acid containing less than three carbon atoms.

6. A process of producing glutamic acid from glutamic acid hydrochloride, present in a solution also containing ammonium chloride, which comprises treating a solution containing the said specified substances with substantially such a limited proportion only of a soluble salt comprising an alkali-forming cation and an anion of an unsubstituted lower aliphatic acid containing less than three carbon atoms, as constitutes a metathetically reacting proportion with the hydrochloric acid constituting a chemically combined portion of the glutamic acid hydrochloride.

7. A process of producing glutamic acid from glutamic acid hydrochloride present in a solution which comprises treating said solution with a salt of a weak acid capable of and substantially proportioned for reacting with the glutamic acid hydrochloride by selectively combining with the hydrochloric acid thereof so as to release the glutamic acid as an insoluble precipitate, the said salt comprising an alkali-forming cation and the anion of an unsubstituted lower aliphatic acid.

8. A process of producing glutamic acid from glutamic acid hydrochloride present in a solution also containing ammonium chloride which comprises treating said solution with a salt of a weak acid capable of and substantially proportioned for reacting with the glutamic acid hydrochloride by selectively combining with the hydrochloric acid thereof so as to release the glutamic acid as an insoluble precipitate, the said salt comprising an alkali-forming cation and the anion of an unsubstituted lower aliphatic acid.

9. A process of producing glutamic acid from glutamic acid hydrochloride present in a solution which comprises treating said solution with a salt of a weak acid capable of and substantially proportioned for reacting with the glutamic acid hydrochloride by selectively combining with the hydrochloric acid thereof so as to release the glutamic acid as an insoluble precipitate, the said salt being a salt containing a cation which with chlorine forms a soluble chloride and an anion of another aliphatic acid which, by initial reaction with liberated glutamic acid, forms a readily dissociable addition product, by the dissociation of which, glutamic acid, after such initial reaction, is precipitated with substantial completeness.

10. A process of producing glutamic acid from glutamic acid hydrochloride present in a solution also containing ammonium chloride which comprises treating said solution with a salt of a weak acid capable of and substantially proportioned for reacting with the glutamic acid hydrochloride by selectively combining with the hydrochloric acid thereof so as to release the glutamic acid as an insoluble precipitate, the said salt being a salt containing a cation which with chlorine forms a soluble chloride and an anion of another aliphatic acid which, by initial reaction with liberated glutamic acid, forms a readily dissociable addition product, by the dissociation of which, glutamic acid, after such initial reaction, is precipitated with substantial completeness.

11. A process of producing glutamic acid from glutamic acid hydrochloride, which comprises treating a solution of glutamic acid hydrochloride with a soluble salt of an unsubstituted lower aliphatic acid containing less than three carbon atoms.

12. A process of producing glutamic acid from glutamic acid hydrochloride, present in a solution also containing ammonium chloride, which comprises treating a solution containing the said specified substances with substantially such a limited proportion only of a soluble salt of an unsubstituted lower aliphatic acid containing less than three carbon atoms, as constitutes a metathetically reacting proportion with the hydrochloric acid constituting a chemically combined portion of the glutamic acid hydrochloride.

GÉZA BRAUN.